UNITED STATES PATENT OFFICE.

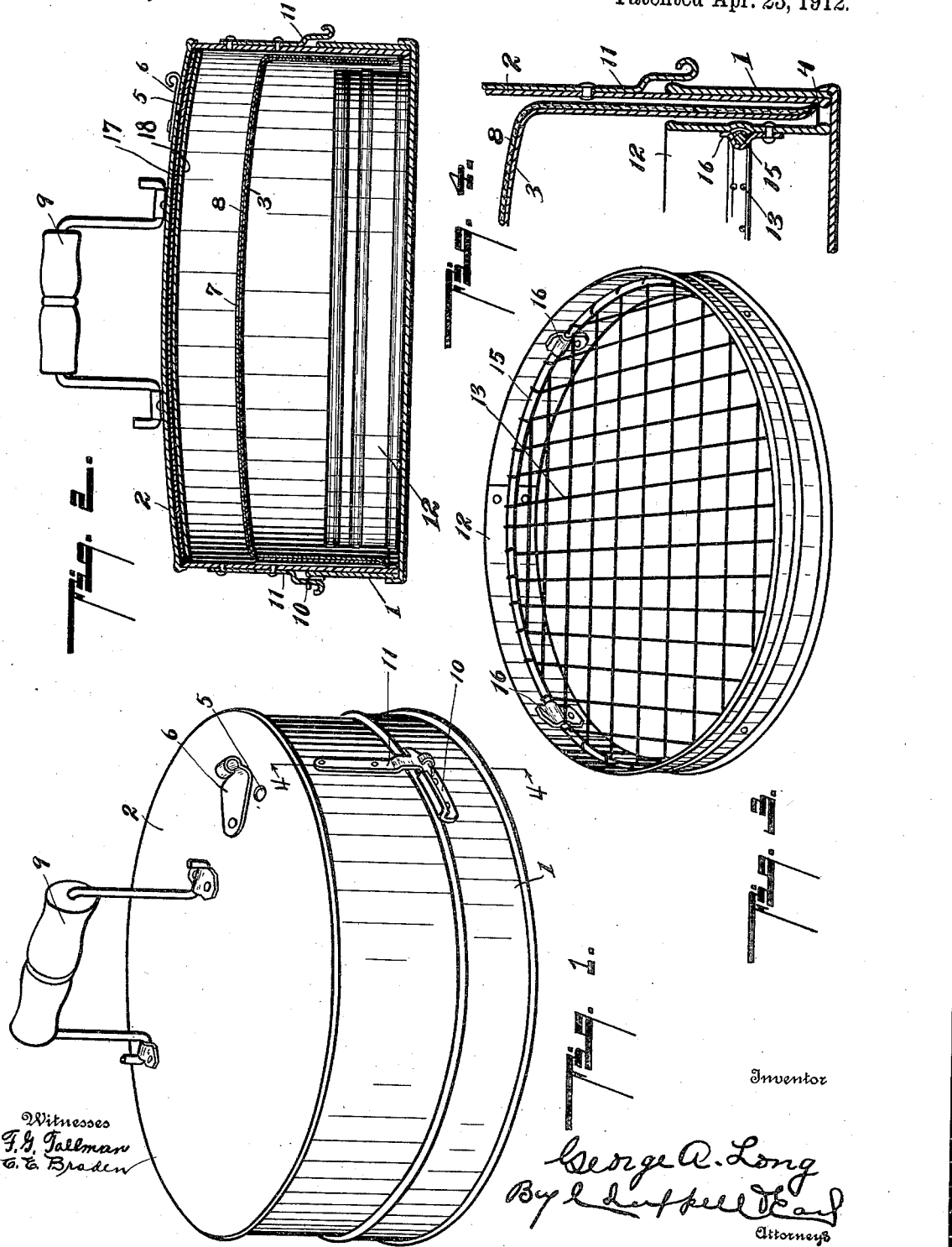

GEORGE A. LONG, OF STURGIS, MICHIGAN.

COOKER.

1,024,213.　　　　Specification of Letters Patent.　　Patented Apr. 23, 1912.

Application filed December 24, 1909. Serial No. 534,798.

*To all whom it may concern:*

Be it known that I, GEORGE A. LONG, a citizen of the United States, residing at Sturgis, Michigan, have invented certain new and useful Improvements in Cookers, of which the following is a specification.

This invention relates to improvements in cookers.

My improved cooker is especially designed by me for baking or steaming potatoes, although it is adapted for cooking various other articles.

The main objects of this invention are, to provide an improved cooker in which articles may be very quickly baked or steamed as desired, and one which is economical in fuel.

Further objects, and objects relating to structural details, will definitely appear from the detailed description to follow.

I accomplish the objects of my invention by the devices and means described in the following specification.

The structure described constitutes one effective embodiment of my invention. Other embodiments would be readily devised by those skilled in the art.

The invention is clearly defined and pointed out in the claims.

A structure constituting an effective and preferred embodiment of the features of my invention is clearly illustrated in the accompanying drawing, forming a part of this specification, in which:

Figure 1 is a perspective view of my improved cooker. Fig. 2 is a vertical central section thereof, the article holder being shown in full lines. Fig. 3 is a perspective view of the holder. Fig. 4 is an enlarged detail vertical section taken on a line corresponding to line 4—4 of Fig. 1.

In the drawing similar numerals of reference refer to similar parts throughout the several views, and the sectional views are taken looking in the direction of the little arrows at the ends of the section lines.

Referring to the drawing, the base 1 of my improved cooker is preferably pan-like and cylindrical, as illustrated. The top is dome-like in shape and provided with cylindrical side walls adapted to telescope into the side walls of the base, the lower edges of the side walls of the top being adapted to rest on the base. Within the top is a dome-shaped inner wall 3. This inner wall is dome-like in shape and is adapted to be adjusted within the top. The lower edge of the inner wall is preferably turned or spun outwardly at 4 to slidably engage the side walls of the top, so that the inner wall is adjustably supported in a spaced relation to the walls of the top.

The top is preferably provided with a vent 5 and pivoted closure therefor 6. The inner wall is preferably provided with a vent 7. The inner wall in the structure illustrated has a cover 8 of asbestos.

The top has a handle 9 of the well known form. The base is preferably provided with keepers 10 and the top with coacting catches 11, which are engaged with the keepers by turning the top on the base.

The articles to be cooked are preferably placed in a holder consisting of a band-like rim 12 in which is supported a rack 13, the rack shown being formed of wire woven onto a ring 15, the ring being supported on the band by means of clips 16. The rack is preferably arranged nearer one edge of the band than it is to the other, so that the articles can be supported at the desired height from the base by the reversing of the ring.

In use the articles, such as potatoes, are placed on the rack and the top arranged and secured. If it is desired to steam the potatoes the vent 5 is closed; if it is desired to bake them the vent is left open to permit the moisture to escape. It is found in practice that for articles such as potatoes no additional moisture is required to properly cook them by steaming.

The inner wall is made adjustable to accommodate greater or less quantities of articles to be cooked. As it is spaced from the top an insulating air chamber is provided to retard radiation. To prevent radiation of heat through the top, I provide a lining 17 therefor, of asbestos, and a metal lining 18 which supports and protects the asbestos.

My improved cooker is very effective in that articles can be quickly cooked, and the cooker is very economical in the fuel required.

In cooking beans, the vent is closed until the beans are properly boiled or steamed, when it is opened to complete the cooking by baking the same.

My improved cooker is adapted to be placed on the top of a coal or wood stove, or over a gas burner. I preferably enamel the base and top.

I have illustrated my improvements in the form in which I have embodied them. I am aware that they are capable of considerable variation in structural details without departing from my invention, and I desire to be understood as claiming the same specifically as illustrated, as well as broadly within the scope of the appended claims.

I claim—

1. In a cooker, the combination of a base open at the top and having imperforate bottom and side walls; a top portion open at the bottom, having imperforate side walls adapted to telescope into the side walls of the base; a dome-shaped inner wall open at the bottom arranged in said top portion to be vertically adjusted therein, the height of said inner wall being substantially less than that of the said top portion to permit its adjustment to change the size of the cooking chamber, said inner wall having frictional engagement with the side walls of the top portion whereby the said inner wall is supported in its adjusted positions in said top portion; and a removable holder comprising a band-like rim resting on said base, and a rack secured within said rim whereby it is supported above the bottom of said base, the side walls of said top portion and the inner wall thereof embracing said rim.

2. In a cooker, the combination of a base open at the top and having imperforate bottom and side walls; a top portion open at the bottom, having imperforate side walls adapted to telescope into side walls of the base; a dome-shaped inner wall open at the bottom arranged in said top portion to be vertically adjusted therein, the height of said inner wall being substantially less than that of the said top portions to permit its adjustment to change the size of the cooking chamber, the lower edge of said inner wall being turned outward to frictionally engage the side walls of the top portion whereby the said inner wall is supported in its adjusted position in said top portion and spaced therefrom.

3. In a cooker, the combination of a base open at the top and having imperforate bottom and side walls; a top portion open at the bottom, having imperforate side walls adapted to telescope into the side walls of the base, the top of said top portion having a vent opening therein and a closure for said vent opening; and a dome-shaped inner wall open at the bottom and having a vent in its top, arranged in said top portion to be vertically adjusted therein, the height of said inner wall being substantially less than that of the said top portion to permit its adjustment to change the size of the cooking chamber, said inner wall having frictional engagement with the side walls of the top portion whereby the said inner wall is supported in its adjusted positions in said top portion.

4. In a cooker, the combination of a base open at the top and having imperforate bottom and side walls; a top portion open at the bottom having imperforate side walls adapted to telescope into the side walls of the base; a dome-shaped inner wall open at the bottom arranged in said top portion to be vertically adjusted therein, the height of said inner wall being substantially less than that of the said top portion to permit its adjustment to change the size of the cooking chamber, said inner wall having frictional engagement with the side walls of the top portion whereby the said inner wall is supported in its adjusted positions in said top portion.

5. The combination with a cylindrical base portion open at its upper end and having cylindical side walls, of a top portion having cylindrical side walls adapted to telescope into the side walls of said base, flange-like keepers on the side walls of said base, and a plurality of inverted T-shaped catches rigidly mounted on said top to project outwardly and downwardly over the upper edge of said side walls of said base portion and adapted to be engaged with either end of said keepers by a turning movement of said top in either direction, said catches and keepers coacting to provide stops.

In witness whereof, I have hereunto set my hand and seal in the presence of two witnesses.

GEORGE A. LONG. [L. S.]

Witnesses:
L. G. GREENFIELD,
F. G. TALLMAN.

---

Copies of this patent may be obtained for five cents each, by addressing the "Commissioner of Patents, Washington, D. C."